Figure 1:
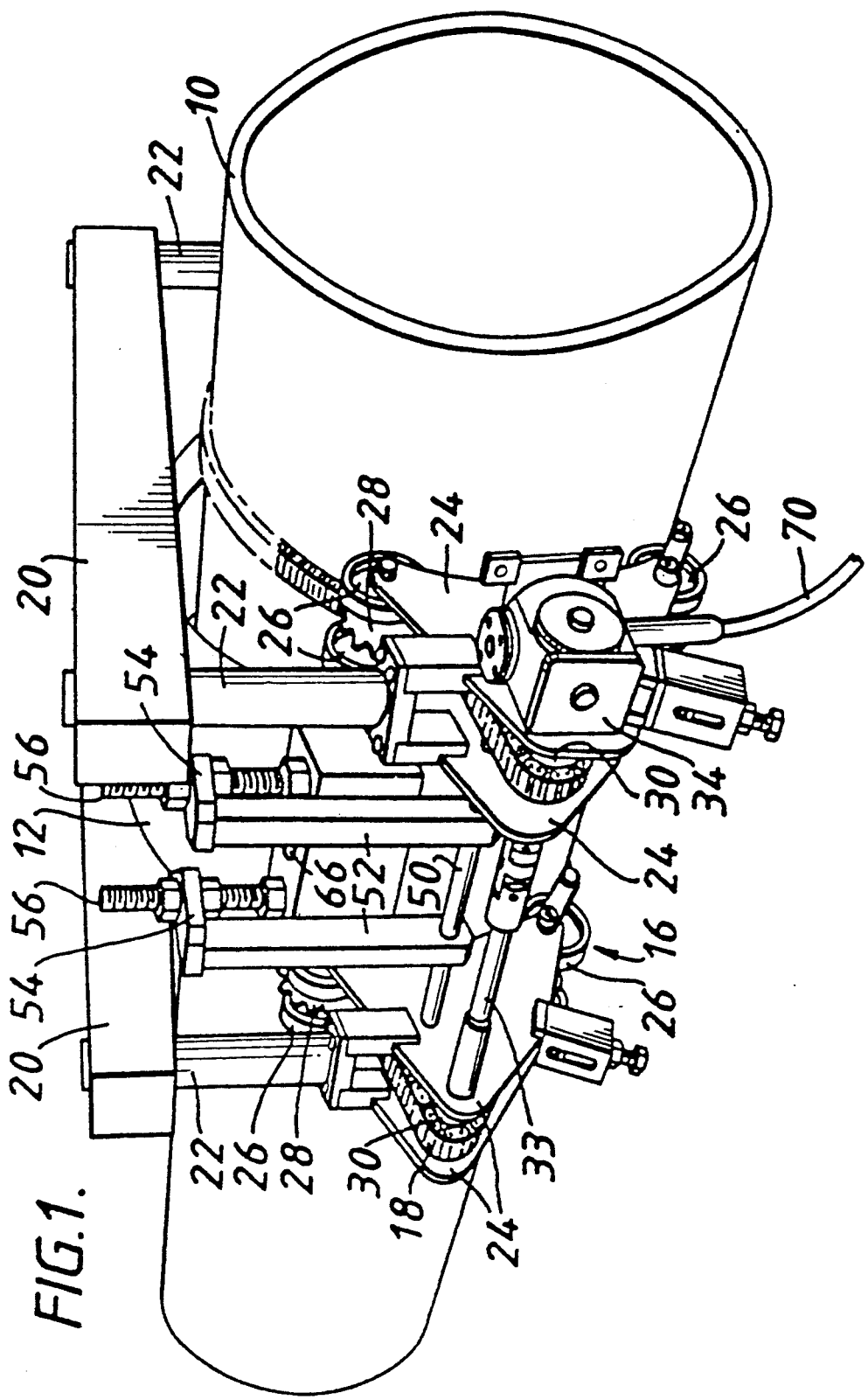

United States Patent [19]

Jude

[11] Patent Number: 5,313,986
[45] Date of Patent: May 24, 1994

[54] METHOD FOR POSITIONING COMPONENTS ON A CYLINDRICAL MEMBER

[75] Inventor: Dennis W. Jude, Corbridge, United Kingdom

[73] Assignee: British Gas plc, London, England

[21] Appl. No.: 852,174

[22] PCT Filed: Aug. 20, 1991

[86] PCT No.: PCT/GB91/01412
§ 371 Date: Apr. 6, 1992
§ 102(e) Date: Apr. 6, 1992

[87] PCT Pub. No.: WO92/03680
PCT Pub. Date: Mar. 5, 1992

[30] Foreign Application Priority Data

Aug. 20, 1990 [GB] United Kingdom ............... 9018253

[51] Int. Cl.⁵ .................................................. F16L 55/16
[52] U.S. Cl. ........................................ 138/99; 138/97;
138/178; 414/782; 29/237; 269/156
[58] Field of Search ............... 188/97, 99, 110, 178;
414/782, 777, 781, 757, 767, 778; 29/282, 259,
237, 281.5; 269/156

[56] References Cited

U.S. PATENT DOCUMENTS

| | | |
|---|---|---|
| 2,230,287 | 2/1941 | Curtis . |
| 2,691,211 | 10/1954 | Leiber .................................. 29/237 |
| 2,787,051 | 4/1957 | Risley ................................. 138/99 |
| 3,144,496 | 8/1964 | Langlitz ............................. 414/782 |
| 3,257,714 | 6/1966 | Duke et al. ........................ 29/237 |
| 3,308,691 | 3/1967 | Guier . |
| 3,364,555 | 1/1968 | Swink ................................ 29/237 |
| 3,685,545 | 8/1972 | Smith et al. . |
| 3,868,101 | 2/1975 | Nozaki et al. ..................... 414/767 |
| 4,098,415 | 7/1978 | Mason ............................... 414/781 |
| 4,205,407 | 6/1980 | King et al. . |
| 4,205,694 | 6/1980 | Thompson et al. . |
| 4,342,338 | 8/1982 | Glennie . |
| 4,535,822 | 8/1985 | Rogers ............................... 138/99 |
| 4,782,577 | 11/1988 | Bahler ............................... 29/237 |
| 5,012,842 | 5/1991 | Savard ............................... 138/99 |

FOREIGN PATENT DOCUMENTS 862124 1/1953 Fed. Rep. of Germany ...... 414/777
2180908 4/1987 United Kingdom .

Primary Examiner—James E. Bryant, III
Attorney, Agent, or Firm—Larson and Taylor

[57] ABSTRACT

The method and apparatus are useful in positioning components, for example two half shells of a clamp for a pipeline or other cylindrical member (10). One half-shell (12) is clamped by studs (56) to brackets (52) on a carriage (16) which can then traverse about the member (10) by engagement of sprockets (30, 28) with chains (18) encircling the member (10). A second half-shell is then lowered by crane onto the member (10). The two half shells are clamped together by studs and the brackets (52) released and swung clear. The apparatus can then be removed if desired. Drive to the carriage (16) is through a flexible shaft (70), gearbox (34) and sprockets (30) connected together by drive shaft (33). Wheels (26) roll on the member (10).

3 Claims, 2 Drawing Sheets

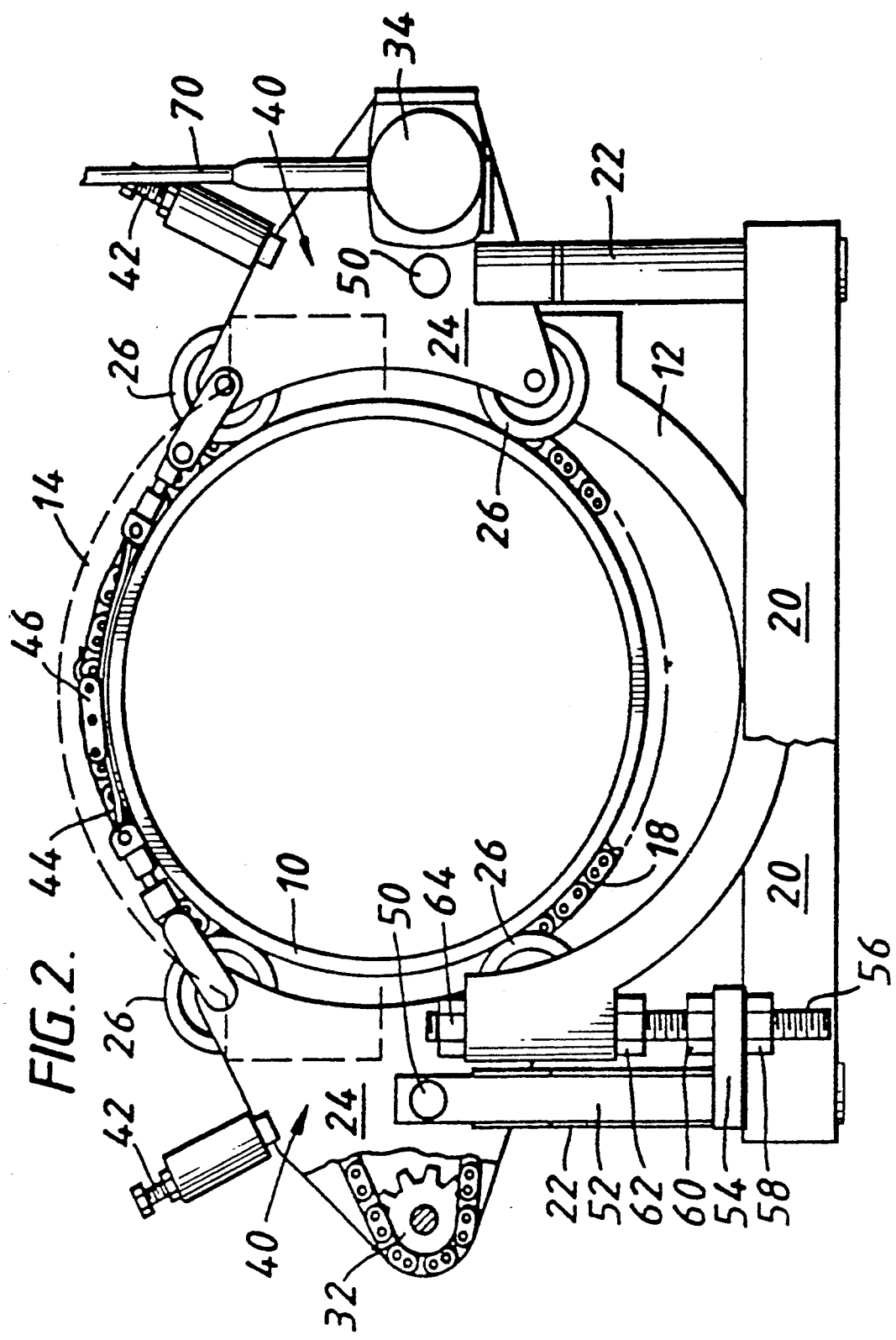

METHOD FOR POSITIONING COMPONENTS ON A CYLINDRICAL MEMBER

The invention relates to methods and apparatus for positioning components.

According to the invention, a method of positioning particular components against a cylindrical member using a carriage which can execute traversing movements about the member, said carriage being driven during said traversing movements by sprockets engaging stationary chain means encircling said member, comprises effecting support of a first component upon the carriage, moving the carriage and the first component about the member and placing a second component in the position previously occupied by the first component.

According to the invention apparatus for positioning particular components against a cylindrical member comprises a carriage which can traverse around said member, chain means which encircle the member and are engaged by sprockets on the carriage and first releasable means on the carriage by which a first component can be supported.

The method and apparatus for performing it will now be describe by way of example with reference to the following drawings in which -

FIG. 1 is a perspective view of the apparatus showing a first component supported about a cylindrical member; and FIG. 2 is an end view of the apparatus (partly in vertical section) 180 degrees in relation to the position shown in FIG. 1 and showing a second component (in chain outline) supported by the cylindrical member.

FIG. 1 shows a cylindrical member 10 such as a pipeline or cylindrical tubular member of a drilling platform or rig. It is required to position two semi-cylindrical components (or half shells) about the cylindrical member 10 to clamp the cylindrical member 10. For example, the half-shells may be the half-shells or a repair clamp.

One of the components 12 is shown in FIG. 1 and the other 14 is shown in FIG. 2 in chain outline.

The apparatus for positioning the components 12, 14 comprises a carriage 16 and two endless chains 18 which encircle the member 10. The carriage 16 can traverse around the member 10 by engagement with the chains 18.

Each half of the carriage 16 comprises a beam 20 having adjacent each end a tube 22, connected to a pair of triangular plates 24 carrying pairs of wheels 26 engaging the outer surface of the member 10. Each pair of wheels 26 is fast with a sprocket 28 arranged between the wheels 26 and engaging a chain 18.

Each chain 18 is engaged by further sprockets 30, 32. The two sprockets 30 are inter-connected by a drive shaft 33 driven by a gearbox 34. The sprockets 32 are idler sprockets and they are not interconnected. The chains 18 are tensioned by a further sprocket (not shown) at 40 (FIG. 2) positioned by a bolt 42. The ends of the pairs of triangular plates 24 remote from the beams 20 are interconnected by a strap 44 and ratchet fastener device 46 (FIG. 2).

The two halves of the carriage 16 are interconnected by two bars 50 which enter holes in the plates 24. Pivoted on each bar 50 are two brackets 52. Each bracket 52 has a cantilever end piece 54. The end piece 54 has a through-hole with its axis parallel to the length of the bracket 54. A stud 56 extending through the hole affords support for the first component 12, together with nuts 58, 60, 62, 64 (FIG. 2). One of the studs 56 is omitted from FIG. 2. The studs 56 enter the end holes of a series of three holes in each flange of the first component 12. The middle hole of the three is just visible in FIG. 1 at 66.

To position the carriage 16 and the chains 18 the following procedure is adopted The two half-carriages, each consisting of a beam 20 and wheeled assemblies at the ends of the tubes 22 are lifted and set onto the pipe or other cylindrical member 10 about the area desired to be repaired or clamped for other reasons. The beams 20 are located relative to one another by temporary spacers (not shown). Both half-carriages remain attached to the crane point at this stage. In each half-carriage, the left-hand tube 22 (as seen in FIG. 2) is hinged to its respective beam 20 to facilitate fitting of the wheel assemblies around the member 10. The hinge incorporates a locking mechanism. Some yielding may be allowed to cater for lack of circularity in the member 10.

The circumferential chains 18 are fed through the wheel and sprocket carriages 16 secured by a breakable link and tensioned by the screws 42. The straps 44 are passed around the member 10 and tightened.

The drive shaft 33 is connected. The bars 50 with the brackets 52 are connected. The two carriage halves are disconnected from the crane sling and the temporary spacers are removed.

The component 12 is lowered by the crane onto the upper half of the member 10. The studs 56 and the nuts 58, 60 and 62 are used to connect the components 12 to the brackets 52. The component 12 is lifted by the nuts on the studs to the position shown in FIG. 1 with sufficient clearance between the component and the member 10 to allow the next step.

The crane sling is removed from the component 12.

The gearbox 34 is operated to transmit drive from the flexible drive shaft 70 to the draft shaft 33 and the sprockets 30. The carriage 16 and the component 12 is turned through 180 degrees about the member 10 to the position shown in FIG. 2. The shaft 70 is manually operable or else a motor (not shown) is used to drive the shaft 70.

The nuts 64 are removed and the second component 14 is lowered by crane onto the member 10. The studs 56 and the brackets 52 act a location guides.

Studs (not shown) are positioned in the central hole 66 and tightened using nuts (not shown). The crane sling is removed. The other studs 56 and the nuts 58, 60, 62 and 64 are released, the brackets 52 are swung clear and the studs 56 are fastened in the end holes, of the two components using two nuts per stud.

The two components 12, 14 are now fully tightened against one another, compressing the seals (not shown), located on their inner sides, against the member 10.

The apparatus is then removed or, if it is too costly to do so (for example, in the sub-sea operations) it is left in place as it does not interfere with the effectiveness of the clamp components 12, 14.

Although the clamp described is made up of two halves, some other types of clamp are made up of a different number, for example three components each extending some 120 degrees around the member 10. The invention applies also to a method and apparatus for positioning such clamps.

In modifications (not shown) carriages may be mechanically linked to accommodate sub-assemblies enclosing single or multi-mode structures of cylindrical members (e.g. in sub-sea structures). The number of sprocket and chain arrangements may be varied to handle increasing size and weight of component. An axial mechanical linkage may be provided on the end of the shaft 33 and a belt encircling the pulley and the member 10, may also provided to give encastre coupling with the carriage as a technique to counteract end movements or tilting movement. Also the same technique can provide additional braking to prevent circumferential slipping of the chain 18.

What is claimed is:

1. A method of positioning first and second part-circular components against a cylindrical member using a carriage which can execute circular traversing movements about the cylindrical member, said carriage being driven during said traversing movements by sprockets engaging a stationary chain encircling said cylindrical member, said method comprising the steps of: effecting support of the first component upon the carriage, moving the carriage and the first component about the cylindrical member, and placing the second component on the cylindrical member in the position previously occupied by the first component.

2. A method according to claim 1 wherein said moving step moves the carriage and the first component 180 degrees about the cylindrical member; wherein said placing step places the second component in a sector previously occupied by the first component; and further including the step of transferring support of said first component from the carriage to said second component.

3. A method according to claim 2, wherein the support between said carriage and said first component, and subsequently the support between said second component and said first component are effected by tightening nuts onto studs carried by the supporting carriage and by the second component.

* * * * *